United States Patent
Wang

(10) Patent No.: US 7,791,870 B2
(45) Date of Patent: Sep. 7, 2010

(54) ELECTRONIC DEVICE

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 96 days.

(21) Appl. No.: 12/344,673

(22) Filed: Dec. 29, 2008

(65) Prior Publication Data

US 2010/0039768 A1 Feb. 18, 2010

(30) Foreign Application Priority Data

Aug. 15, 2008 (CN) .................. 2008 1 0303862

(51) Int. Cl.
*G06F 1/16* (2006.01)

(52) U.S. Cl. ............... 361/679.27; 345/211; 455/575.1; 381/388; 349/109

(58) Field of Classification Search ............ 361/679.27, 361/679.58, 679.14, 679.23; 345/174, 175, 345/211, 179, 214; 455/566, 550.1, 90.3, 455/575.1; 362/612; 381/388; 324/754; 349/139, 150, 96, 114, 109, 113
See application file for complete search history.

(56) References Cited

U.S. PATENT DOCUMENTS

| 7,436,393 | B2 * | 10/2008 | Hong et al. .................. 345/173 |
| 7,536,211 | B2 * | 5/2009 | Saiki et al. ................ 455/575.1 |
| 7,724,243 | B2 * | 5/2010 | Geaghan ..................... 345/173 |
| 2009/0257182 | A1 * | 10/2009 | Yang ..................... 361/679.27 |
| 2009/0257183 | A1 * | 10/2009 | Yang ..................... 361/679.27 |

* cited by examiner

*Primary Examiner*—Hung V Duong
(74) *Attorney, Agent, or Firm*—Clifford O. Chi

(57) ABSTRACT

An electronic device includes a main body, a touch panel positioned on the main body, a shielding member movably connected to the main body adjacent to the touch panel, and a locking module assembled in the main body. The shielding member is configured to move from a first position on top of the touch panel to a second position at a side of the touch panel automatically. The locking module is configured to lock the shielding member in the first position.

18 Claims, 5 Drawing Sheets

ELECTRONIC DEVICE

BACKGROUND

1. Technical Field

The present disclosure generally relates to electronic devices and, more particularly, to an electronic device having a touch panel.

2. Description of Related Art

A typical electronic device such as a notebook computer, has a touch panel as a substitute for a mouse, to control the electronic device. The touch panel is positioned on an operation surface of a main body of the typical electronic device. When a display cover of the typical electronic device is opened, a user can input command via the touch panel.

However, the touch panel and a keyboard of the electronic device are both positioned on the same operation surface of the main body. When a user operates the keyboard, the touch panel is often touched inadvertently, thus potentially introducing a misoperation and problems to the user. In addition, when the display cover of the electronic device is opened, the touch panel is always exposed, even when not being used. Furthermore, a control accuracy of the touch panel may decrease because of contamination caused by dust from an ambient environment, and the usage life of the touch panel may decrease because of abrasion caused by inadvertent collisions.

What is needed, therefore, is a new electronic device that overcomes the above mentioned disadvantages.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION OF THE EMBODIMENTS

The electronic device may be a notebook computer, a personal digital assistant, or a mobile phone. Hereinafter, for the purposes of conveniently describing the electronic device, an embodiment of a notebook computer is described and illustrated.

Figure 1:
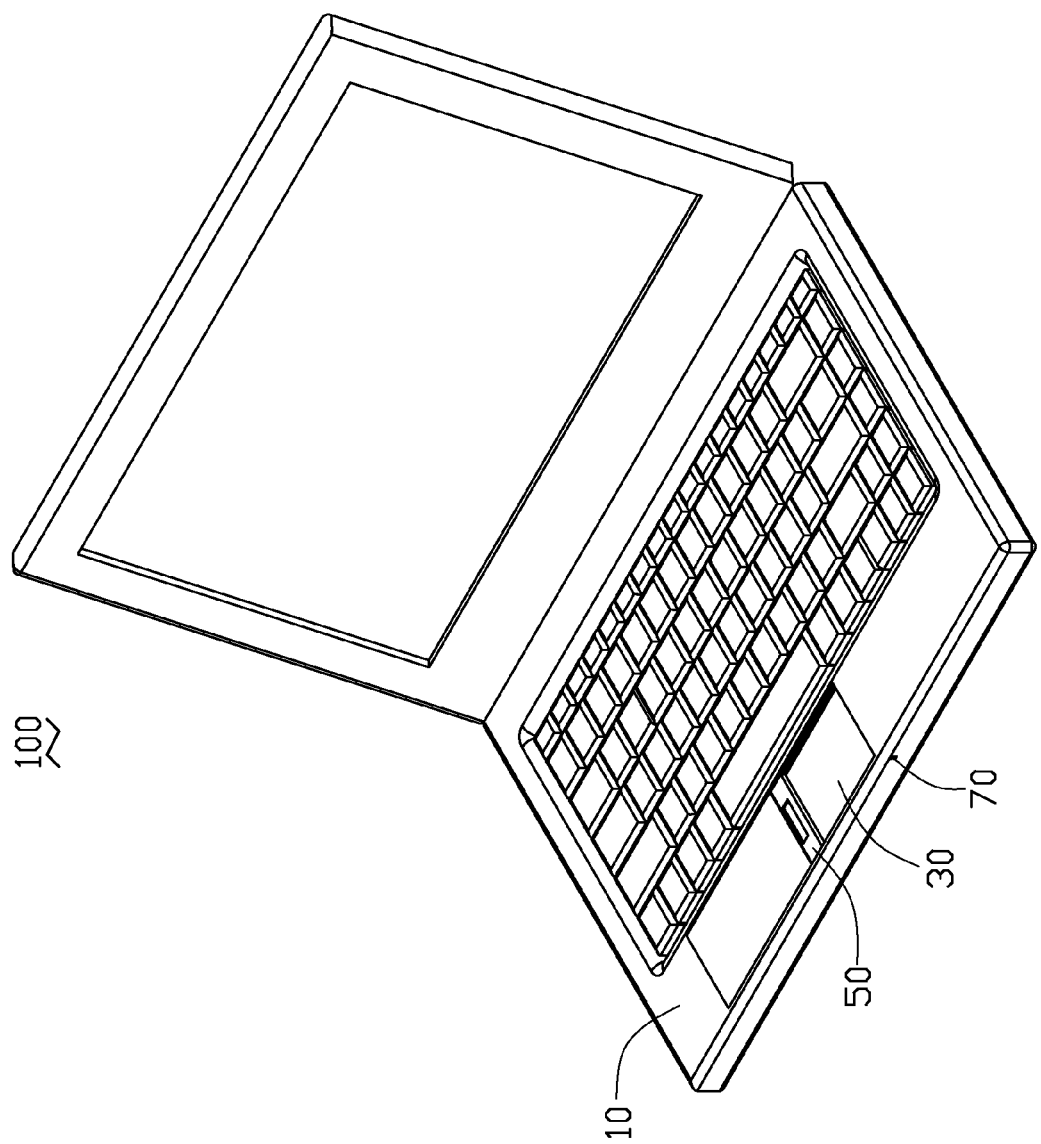
FIG. 1 is an isometric view of an embodiment of an electronic device, the electronic device including a shielding member, an elastic member, and a touch panel.

Referring to FIG. 1, a notebook computer 100 includes a main body 10, a touch panel 30 positioned on the main body 10, a shielding member 50 to protect the touch panel 30, and a locking module 70 to lock the shielding member 50 on the touch panel 30.

Figure 2:
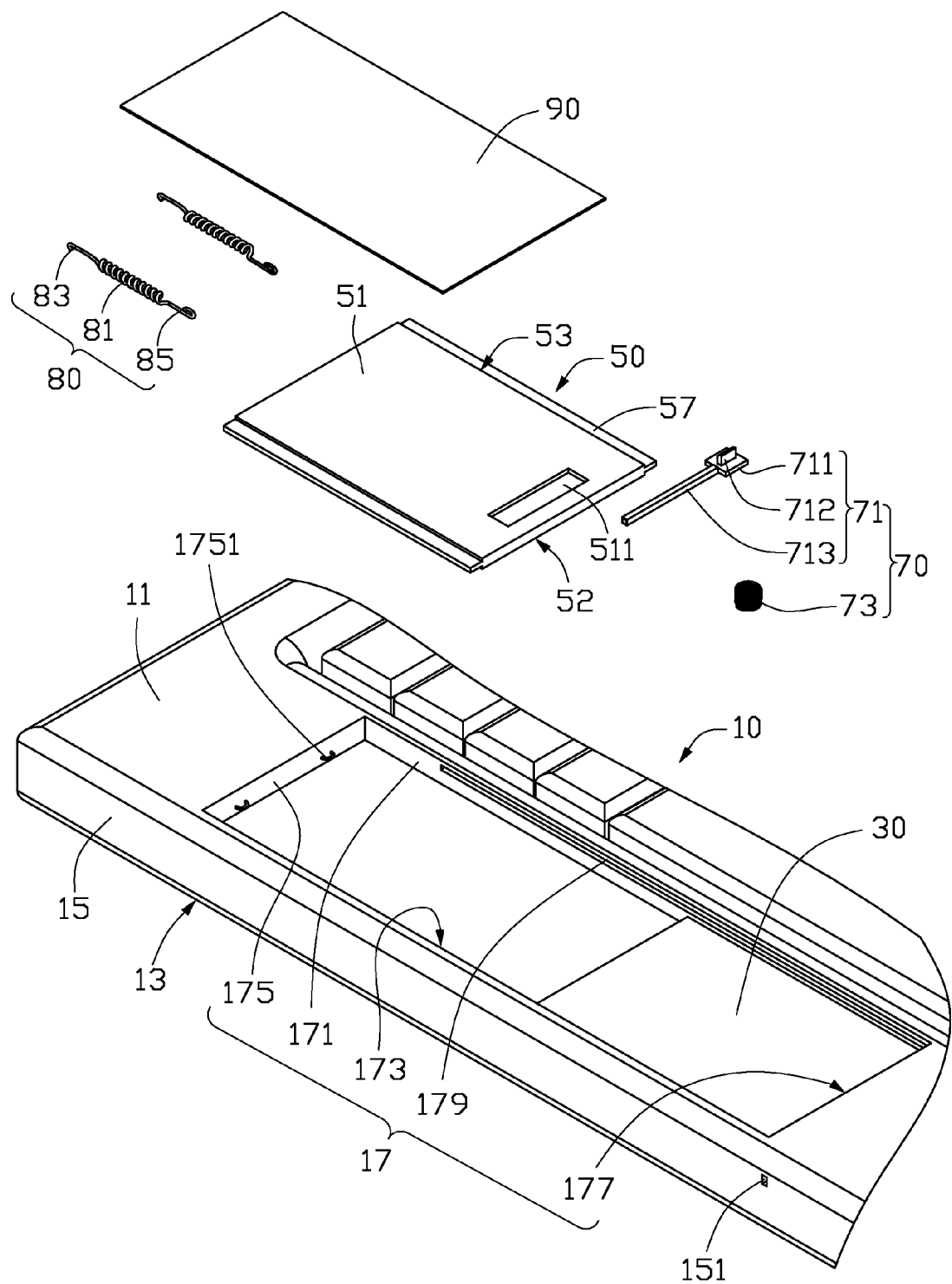
FIG. 2 is a partial, exploded, isometric view of the electronic device in FIG. 1.
Figure 3:
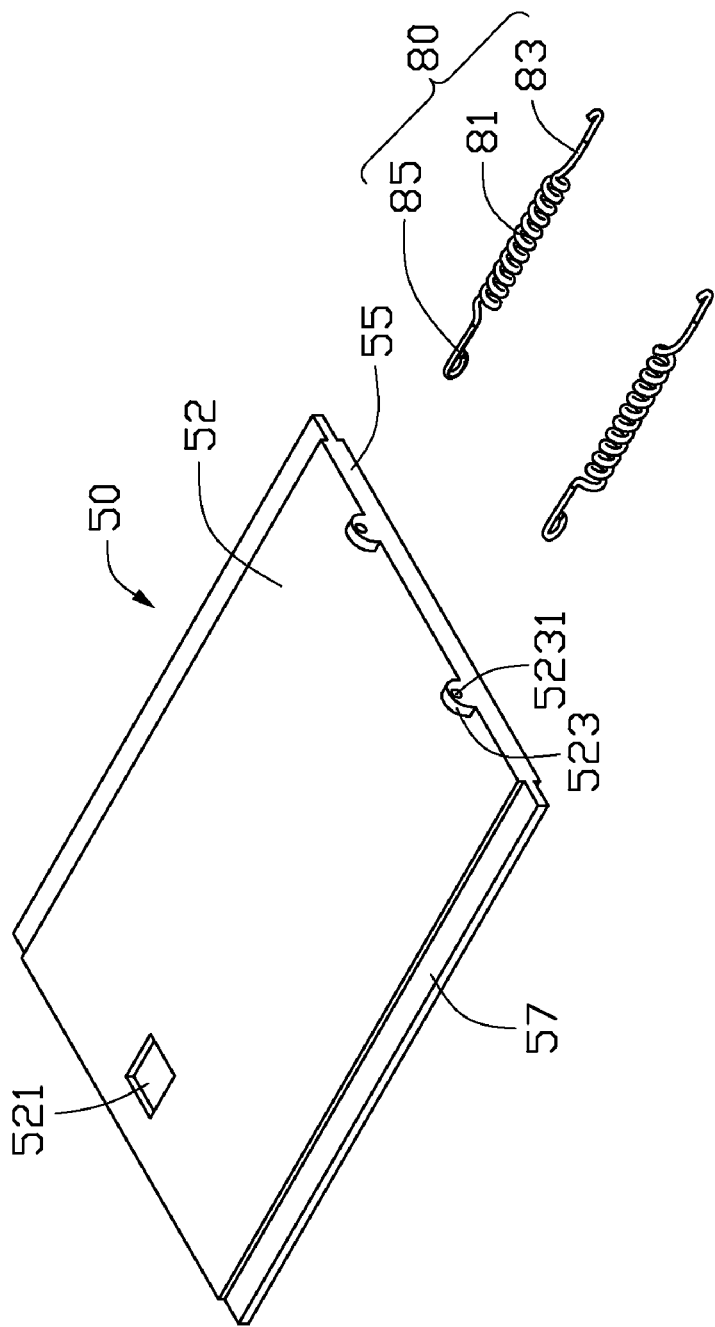
FIG. 3 is an isometric view of the shielding member and the elastic member of the electronic device in FIG. 1.
Figure 4:
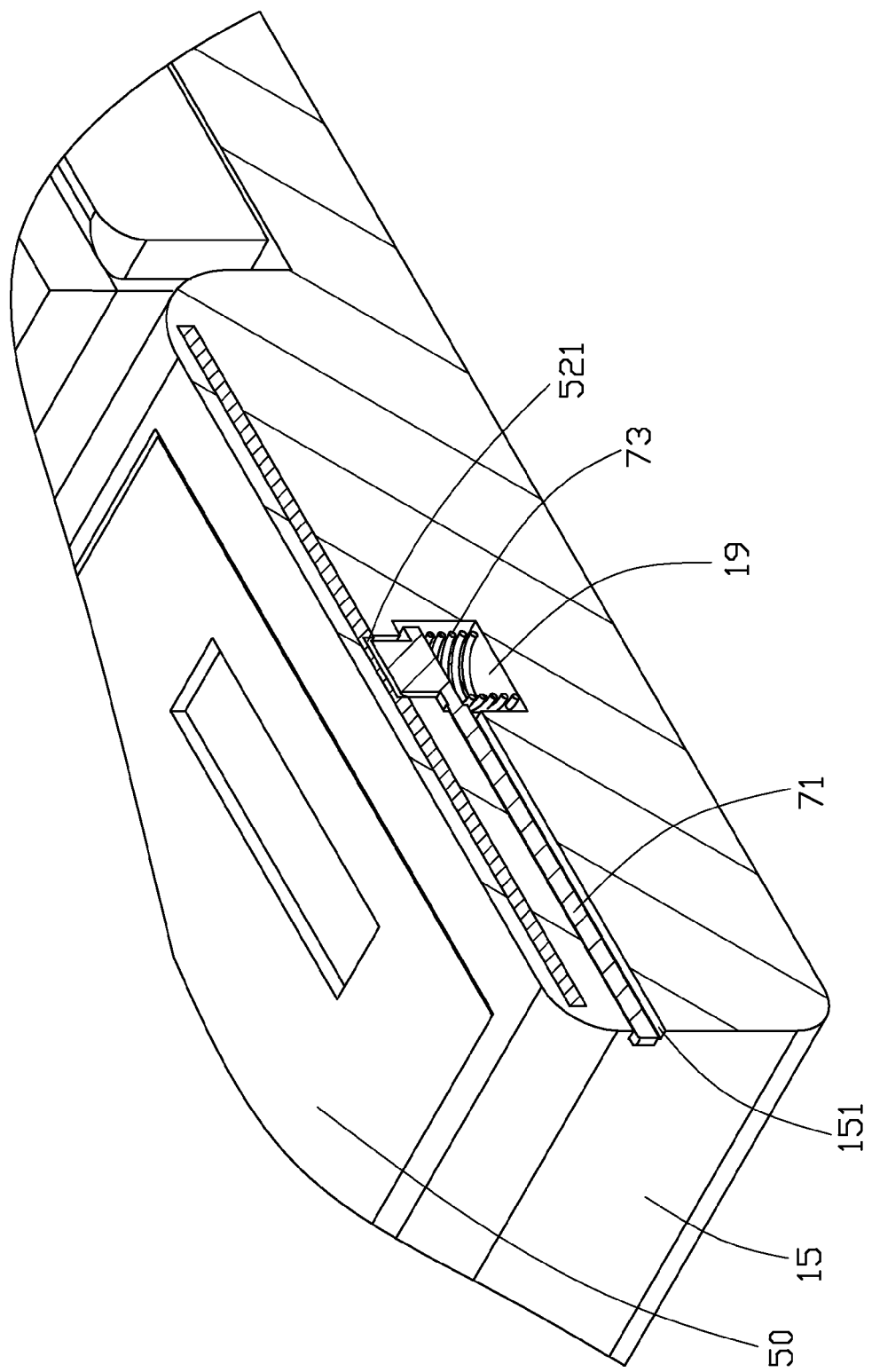
FIG. 4 is a partial, cross-sectional view of the electronic device in FIG. 1.
Figure 5:
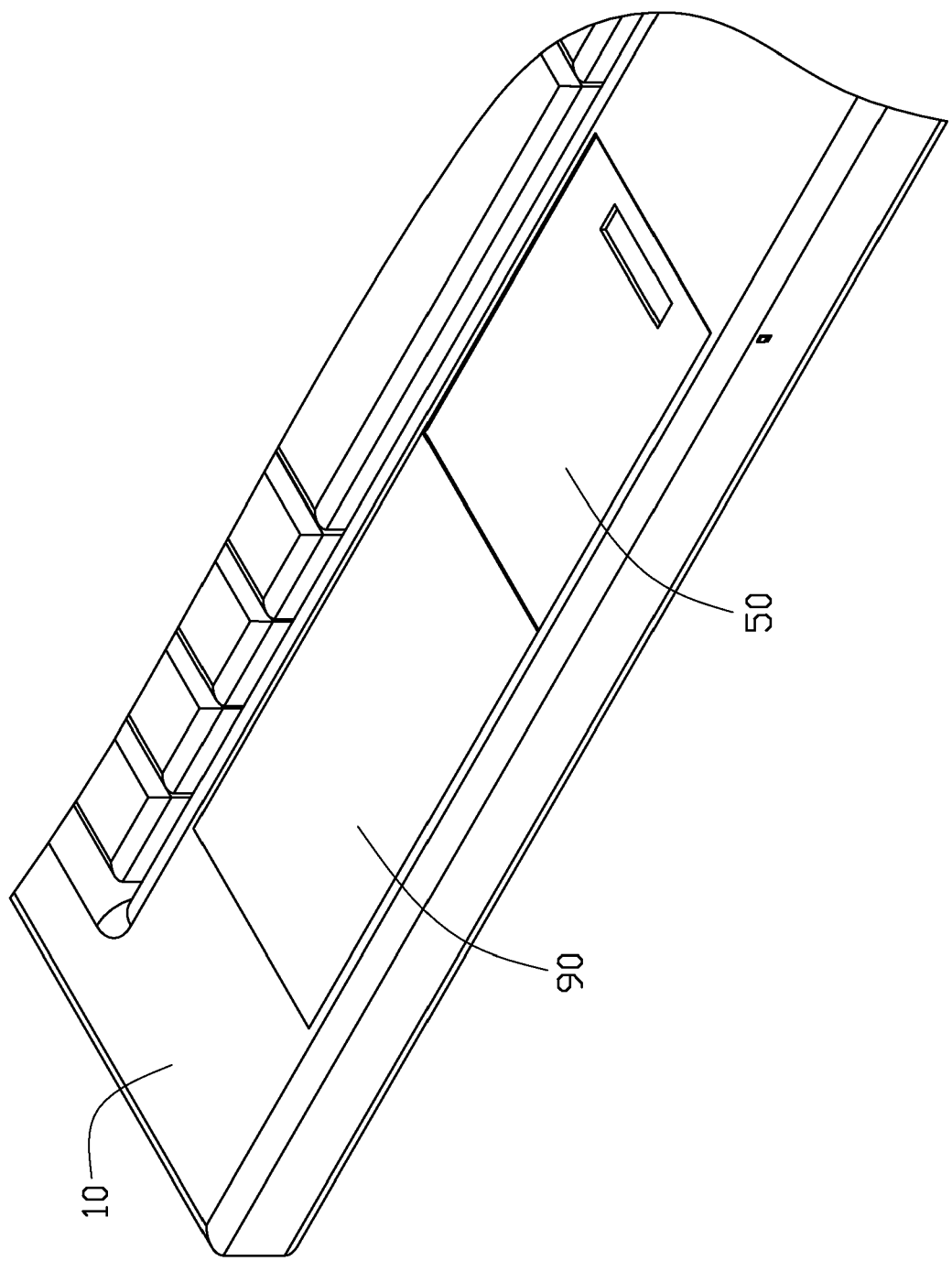
FIG. 5 is a partial, isometric view of the electronic device in FIG. 1, showing the touch panel covered by the shielding member.

Referring to FIGS. 2 through 4, the main body 10 defines a recessed portion 17 in a top surface 11 of the main body 10, a mounting hole 151 in a side surface 15 of the main body 10, and a mounting groove 19 in the main body 10 and communicated with the mounting hole 151.

The recessed portion 17 may be a substantially rectangular recess with a first sidewall 171, a second sidewall 173 opposite the first sidewall 171, a third sidewall 175 adjoining the first sidewall 171, and a fourth sidewall 177 opposite the third sidewall 175. Two sliding grooves 179 are respectively defined in the first sidewall 171 and the second sidewall 173. Two latching rings 1751 are positioned on the third sidewall 175. A latching groove (not shown) communicating with the sliding grooves 179 and the mounting groove 19 is defined in the fourth sidewall 177.

The touch panel 30 is positioned in the recessed portion 17 adjacent to the fourth sidewall 177.

The shielding member 50 may be a rectangular plate with a top surface 51, a bottom surface 52 opposite the top surface 51, and four side surfaces 53 positioned around the periphery of the shielding member 50. The top surface 51 forms a handling portion 511 adjacent to an end of the top surface 51. In the illustrated embodiment, the handling portion 511 is a substantially rectangular groove. The handling portion 511 may be a rough area or a protrusion. The bottom surface 52 defines an engaging hole 521 adjacent to a first end of the bottom surface 52, and forms two arched protrusions 523 on an opposite second end of the bottom surface 52. Each arched protrusion 523 defines a through hole 5231 in a center portion of the arched protrusion 523. In the illustrated embodiment, the engaging hole 521 is a substantially rectangular blind hole. The shielding member 50 also includes two sliding rails 57 formed on opposite side surfaces 53 corresponding to the sliding grooves 179.

The locking module 70 includes an engaging member 71 and a resilient member 73. The engaging member 71 is substantially T-shaped and includes a head portion 711, an engaging projection 712 formed on the head portion 711, and a rod 713 extending from an end of the head portion 711. In the illustrated embodiment, the resilient member 73 is a helical compression spring. The resilient member 73 may be resilient washers, elastic rubber rings, or cylinders.

The notebook computer 100 further includes two elastic members 80 and a cover 90. In the illustrated embodiment, each elastic member 80 is an extension spring having a plurality of spring rings 81, a first hook 83, and a second hook 85 formed on opposite ends of the elastic member 80. The elastic member 80 may also be an elastic strip. The cover 90 is a substantially rectangular plate.

In assembly, the sliding rails 57 of the shielding member 50 are movably inserted in the sliding grooves 179 of the recessed portion 17. The locking module 70 is assembled into the mounting groove 19 and the mounting hole 151. The resilient member 73 is positioned under the head portion 711 for providing elastic force. The engaging projection 712 extends out from the mounting groove 19, to engage in the engaging hole 521 of the shielding member 50. The rod 713 extends through the mounting hole 151, and an end of the rod 713 is exposed to the side surface 15 of the main body 10. The first hook 83 of the elastic members 80 are fixed to the latching rings 1751, and the second hook 85 of the elastic members 80 are fixed to the through holes 5231 of the shielding member 50. The cover 90 is fixed in the recessed portion 17 adjacent to the third sidewall 175 on top of the shielding member 50, to shield the elastic members 80 and a part of the shielding member 50.

In alternative embodiments, the hooks 83, 85 of the elastic member 80 may be omitted. In this configuration, two ends of the elastic member 80 are fixed on the third sidewall 175 of the recessed portion 17 and the side surface 53 of the shielding member 50 by means such as welding or adhesives. In addition, the sliding rails 57 may be formed on the first sidewall 171 and the second sidewall 173 of the recessed portion 17, and the sliding grooves 179 may be defined in opposite side surfaces 53 of the shielding member 50 corresponding to the sliding rails 57.

When the elastic members 80 are in a relaxed state, the touch panel 30 is exposed to the top surface 11 of the main body 10. The shielding member 50 is hidden underneath the cover 90 except that a part of the shielding member 50 having the handling portion 511 is exposed (shown in FIG. 1).

The touch panel 20 may be covered by applying an external force on the handling portion 511, so that the shielding member 50 slides along a direction from the third sidewall 175 towards the fourth sidewall 177, until an end of the shielding member 50 is inserted into the latching groove of the recessed portion 17. At that time, the elastic members 80 are in a tension state. The engaging projection 712 of the locking module 70 engages in the engaging hole 521 of the shielding member 50 to prevent the shielding member 50 from sliding along a direction from the fourth sidewall 177 towards the third sidewall 175.

The touch panel 20 may be exposed by applying an external force on the exposed end of the rod 713, so that the engaging member 71 together with the engaging projection 712 are moved downwards, thereby detaching the engaging projection 712 from the engaging hole 521 of the shielding member 50. The shielding member 50 slides along a direction from the fourth sidewall 177 towards the third sidewall 175 automatically, because of the elastic force created by the elastic members 80, until the touch panel 20 is fully exposed.

Since the touch panel 30 is completely covered by the shielding member 50 when the touch panel 30 is not being used, the shielding member 50 guards the touch panel 30 from any inadvertent input operations. The shielding member 50 also protects the touch panel 30 from collecting dust from the ambient environment, or abrasion caused by inadvertent collisions. As a result, the touch panel 30 will have a high control accuracy and a long usage life.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An electronic device, comprising:
a main body;
a touch panel positioned on the main body;
a shielding member movably connected to the main body adjacent to the touch panel, and configured to move from a first position on top of the touch panel to a second position at a side of the touch panel automatically; and
a locking module assembled in the main body to lock the shielding member in the first position.

2. The electronic device of claim 1, wherein the main body comprises a recessed portion; the touch panel is positioned in the recessed portion.

3. The electronic device of claim 2, wherein the recessed portion comprises two sliding grooves defined in opposite sidewalls thereof; the shielding member comprises two sliding rails formed on opposite side surfaces thereof; the sliding rails are movably inserted into the sliding grooves.

4. The electronic device of claim 2, wherein the recessed portion comprises two sliding rails formed on opposite sidewalls thereof; the shielding member comprises two sliding grooves defined in opposite side surfaces thereof, the sliding rails are movably inserted into the sliding grooves.

5. The electronic device of claim 2, further comprising an elastic member, one end of the elastic member is fixed on a sidewall of the recessed portion and another end of the elastic member is fixed on a side surface of the shielding member.

6. The electronic device of claim 5, wherein the elastic member is a extension spring and includes two hooks; the recessed portion comprises a latching ring positioned on the sidewall thereof; the shielding member comprises an arched protrusion positioned adjacent to the side surface thereof; the arched protrusion defines a through hole therein; one hook is fixed to the latching ring, and the other hook is fixed to the through hole of the arched protrusion.

7. The electronic device of claim 5, further comprising a cover fixed in the recessed portion away from the touch panel, and positioned on top of the shielding member to shield the elastic member and a part of the shielding member.

8. The electronic device of claim 1, wherein the electronic device comprises a locking module to lock the shielding member on the touch panel, the locking module comprises an engaging member and a resilient member, the engaging member includes a head portion, an engaging projection formed on the head portion, and a rod extending from an end of the head portion.

9. The electronic device of claim 8, wherein a bottom surface of the shielding member defines an engaging hole therein; the engaging projection of the locking module is configured to engage in the engaging hole.

10. The electronic device of claim 8, wherein the main body defines a mounting hole in a side surface thereof, and a mounting groove in the main body communicating with the mounting hole; the locking module is assembled into the mounting groove and the mounting hole; the resilient member is positioned under the head portion; the engaging projection extends out from the mounting groove; the rod extends through the mounting hole, and an end of the rod is exposed to an outer surface of the main body.

11. The electronic device of claim 1, wherein the shielding member comprises a handling portion formed on a top surface thereof.

12. An electronic device, comprising:
a main body, wherein a recessed portion is defined in the main body;
a touch panel positioned in the recessed portion;
a shielding member movably connected to the main body, one of the recessed portion and the shielding member defines two sliding grooves therein, the other one of the recessed portion and the shielding member defines two sliding rails thereof, the sliding rails being movably inserted into the sliding grooves;
an elastic member having a first end fixed in the recessed portion and a second end fixed on the shielding member, the elastic member configured to provide an elastic force to enable the shielding member to move from a first position on top of the touch panel to a second position at a side of the touch panel automatically; and
a locking module assembled in the main body to lock the shielding member in the first position.

13. The electronic device of claim 12, wherein the locking module comprises an engaging member and a resilient member, the engaging member includes a head portion, and a rod extending from an end of the head portion.

14. The electronic device of claim 13, wherein the locking module further comprising an engaging projection formed on the head portion; a bottom surface of the shielding member defines an engaging hole therein; the engaging projection is configured to engage in the engaging hole.

15. The electronic device of claim 14, wherein the main body defines a mounting hole in a side surface thereof, and a mounting groove in the main body communicating with the mounting hole; the locking module is assembled into the mounting groove and the mounting hole; the resilient member is positioned under the head portion; the engaging projection extends out from the mounting groove, the rod extends through the mounting hole, and an end of the rod is exposed to an outer surface of the main body.

16. The electronic device of claim 12, further comprising a cover fixed in the recessed portion away from the touch panel, and positioned on top of the shielding member to shield the elastic member and a part of the shielding member.

17. The electronic device of claim 12, wherein the shielding member comprises a handling portion formed on a top surface thereof.

18. The electronic device of claim 12, wherein the electronic device is a notebook computer.

* * * * *